(12) United States Patent
Brachert et al.

(10) Patent No.: US 7,143,739 B2
(45) Date of Patent: Dec. 5, 2006

(54) METHOD OF OPERATING AN INTERNAL COMBUSTION ENGINE

(75) Inventors: Götz Brachert, Stuttgart (DE); Rüdiger Herweg, Esslingen (DE); Matthias Pfau, Ludwigsburg (DE); Jochen Schäflein, Stuttgart (DE); Hans-Jürgen Weimann, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/411,197

(22) Filed: Apr. 25, 2006

(65) Prior Publication Data

US 2006/0219215 A1    Oct. 5, 2006

Related U.S. Application Data

(63) Continuation-in-part of application No. PCT/EP2004/011372, filed on Oct. 12, 2004.

(30) Foreign Application Priority Data

Oct. 29, 2003    (DE) ................................ 103 50 797

(51) Int. Cl.
*F02B 3/08* (2006.01)
*F02B 17/00* (2006.01)

(52) U.S. Cl. ...................... 123/295; 123/299; 123/300; 123/568.14

(58) Field of Classification Search ................ 123/295, 123/299, 300, 568.14
See application file for complete search history.

(56) References Cited

U.S. PATENT DOCUMENTS 6,336,436 B1    1/2002  Miyakubo et al.
6,340,014 B1*   1/2002  Tomita et al. ............... 123/295
6,386,177 B1*   5/2002  Urushihara et al. ..... 123/568.14
6,425,367 B1    7/2002  Hiraya et al.
6,763,799 B1*   7/2004  Ito et al. ...................... 123/299
7,021,277 B1*   4/2006  Kuo et al. ............. 123/568.14
7,051,700 B1*   5/2006  Kuzuyama et al. ......... 123/299
2002/0020388 A1  2/2002  Wright et al.
2002/0046741 A1  4/2002  Kakuho et al.
2005/0211219 A1* 9/2005  Strom et al. ................. 123/299

FOREIGN PATENT DOCUMENTS

| DE | 195 19 663 | 5/1996 |
| DE | 198 10 935 A1 | 9/1999 |
| DE | 198 10 935 C2 | 3/2000 |
| DE | 198 52 552 | 5/2000 |
| WO | WO 01/86125 | 11/2000 |

\* cited by examiner

*Primary Examiner*—Erick Solis
(74) *Attorney, Agent, or Firm*—Klaus J. Bach

(57) ABSTRACT

In a method of operating an internal combustion engine in which exhaust gas is retained in the combustion chamber of the internal combustion engine and compressed during a charge change together with fresh combustion air, a first fuel quantity is injected into the retained exhaust gas by means of direct fuel injection, a second fuel quantity is subsequently supplied to the combustion chamber together with the fresh combustion air so that a homogeneous fuel/gas/air mixture is formed in the combustion chamber, and an auto-ignition time of the fuel/gas/air mixture is established as a function of a quantity ratio of the first fuel quantity and the second fuel quantity.

8 Claims, 2 Drawing Sheets

METHOD OF OPERATING AN INTERNAL COMBUSTION ENGINE

This is a Continuation-In-Part Application of International Application PCT/EP2004/011372 filed 12 Oct. 2004 and claiming the priority of German Application 103 50 797.3 filed 29 Oct. 2003.

BACKGROUND OF THE INVENTION

The invention relates to a method of operating an internal combustion engine, in particular a compression- or auto-ignition internal combustion engine with direct fuel injection including a cylinder with a cylinder head having intake and exhaust valves and a piston for compressing combustion gases in the cylinder into which fuel is injected for combustion therein.

In direct-injection internal combustion engines with auto-ignition, lean homogeneous fuel/air mixtures are often made to auto-ignite so that high efficiency levels and improved exhaust emissions are obtained. In such internal combustion engines which are referred to as HCCI or PCCI internal combustion engines, that is, internal combustion engines with spatial compression ignition, a lean basic mixture of air, fuel and retained exhaust gas is generally formed at partial load and auto-ignited. During full load operation, a stoichiometric mixture is frequently formed and spark-ignited because at high loads steep rises in pressure could occur in the combustion chamber due to the auto-ignition and these would adversely affect the operation.

Patent DE 198 10 935 C2 discloses a method of operating an internal combustion engine which operates according to the four stroke principle and in which a homogeneous lean mixture of air, fuel and retained exhaust gas is formed and is burnt after compression ignition. In this context, there is an intermediate activation phase in order to expand the operating range of the motor with compression ignition: During the compression of the retained exhaust gas, an activation fuel quantity is injected into the combustion chamber and distributed as homogeneously as possible in the combustion chamber with the residual components of the mixture. In this way thermal energy is supplied to the mixture by power and compression so that a chemical reaction or ignition is initiated in the vicinity of the top dead center of the charge cycle. The ignition time of the fresh charge can be controlled during the main compression by the timing and the quantity of the activation injection.

In accordance with the current state of the art however, it is difficult to selectively control the combustion described above since the time of auto-ignition depends very greatly on the parameters of the engine and the ambient conditions. For this reason, attempts are made to control the initiation of the compression ignition using suitable control variables, for example by means of a cylinder pressure signal. Such concepts are, however, associated with a high degree of expenditure on engine control technology which results in higher manufacturing costs of such internal combustion engines.

It is therefore the object of the present invention to provide a method of operating an internal combustion engine in such a way that the timing of the auto-ignition can be more reliably controlled.

SUMMARY OF THE INVENTION

In a method of operating an internal combustion engine in which exhaust gas is retained in the combustion chamber of an internal combustion engine and compressed during a charge change together with fresh combustion air, a first fuel quantity is injected into the retained exhaust gas by means of direct fuel injection, and a second fuel quantity is subsequently supplied to the combustion chamber together with the fresh combustion air so that a homogeneous fuel/gas/air mixture is obtained in the combustion chamber, and an auto-ignition time of the fuel/gas/air mixture is established as a function of a quantity ratio of the first fuel quantity and the second fuel quantity.

The first fuel quantity is injected into the retained exhaust gas by means of a first injector arranged in the combustion chamber. The second fuel quantity is subsequently supplied to the intake air by means of a second injector arranged in the intake manifold. The second fuel quantity is preferably injected into the combustion air inside the intake manifold device during the combustion air intake phase.

The injection of fuel in the intake manifold leads to better homogenization of the fuel/air mixture which is formed and at the same time reduces the raw emissions of the internal combustion engine. By carrying out the first fuel injection by means of a direct fuel injection the reactivity of the mixture can be more easily and better influenced. As a result, in the method according to the invention the advantages of direct fuel injection and the advantages of port fuel injection are combined in an advantageous way so that the control of the current combustion process can be optimized. The first injector is preferably configured and optimized for direct fuel injection of small fuel quantities so that the installation space which is required for the first injector in the combustion chamber or in the cylinder head can be minimized. As a result, the position of the injector and the injection angle can easily be adapted to the requirements. In this context, the second injector in the inlet port can be configured and optimized for relatively large fuel quantities in order to be able to carry out full load operation of a spark ignition engine if necessary.

In one embodiment of the invention, during the compression ignition mode an auto-ignition time of the fuel/air mixture which is formed from the first and second fuel quantities is set as a function of a quantity ratio of the first fuel quantity and the second fuel quantity.

The injection of the first fuel quantity into the retained exhaust gas brings about optimum homogenization or pre-conditioning of the first fuel quantity, which leads to an increase in mixture reactivity of the fuel/air mixture which is formed from the first and second fuel quantities. This favors the inception of the auto-ignition, in particular at operating points with a low exhaust gas temperature. The first fuel injection is preferably performed between the closing of an outlet valve and the opening of an inlet valve. Depending on the injection time of the first fuel quantity, the preconditioning effect can extend beyond pure homogenization. If, in particular, the fuel is injected into the retained exhaust gas before the top dead center of the charge change, if the exhaust gas also contains residual air, conversion-like reactions can occur, as a result of which the temperature of the mixture can be influenced, in particular increased.

In a further refinement of the invention, the quantity ratio of the first fuel quantity to the second fuel quantity is in the range of 1:100 to 2:1, in particular of 1:5 to 1:3. As a result the preconditioning effect can be adapted to the current operating point by means of the first fuel quantity. The injection of the second fuel quantity preferably takes place in synchronism with the air induction so that the reactivity of the mixture which is set by means of the first fuel quantity is neither increased nor decreased. The second fuel quantity is thus primarily used to set a desired load.

According to a further refinement of the invention, a center of the combustion activity is established by injecting a third fuel quantity after the injection of the second fuel quantity has ended and preferably before a top dead center position of the piston. The third fuel quantity is aimed at reducing the reactivity of the total cylinder charge in particular under high loads. This is intended to reduce high burning speeds and large pressure peaks in the combustion chamber.

In a further refinement of the invention, the period of combustion is set as a function of the third fuel quantity and its injection time. With the reduction in the reactivity of the mixture which is brought about by the third fuel quantity the burning of the cylinder charge is slowed down so that, depending on the injection time of the third fuel quantity, the combustion period can be optimized as a function of the load.

Further features of the method according to invention will become apparent from the following description of particular exemplary embodiments of the invention with reference to the accompanying drawings:

DESCRIPTION OF AN EXEMPLARY EMBODIMENT

Figure 1:
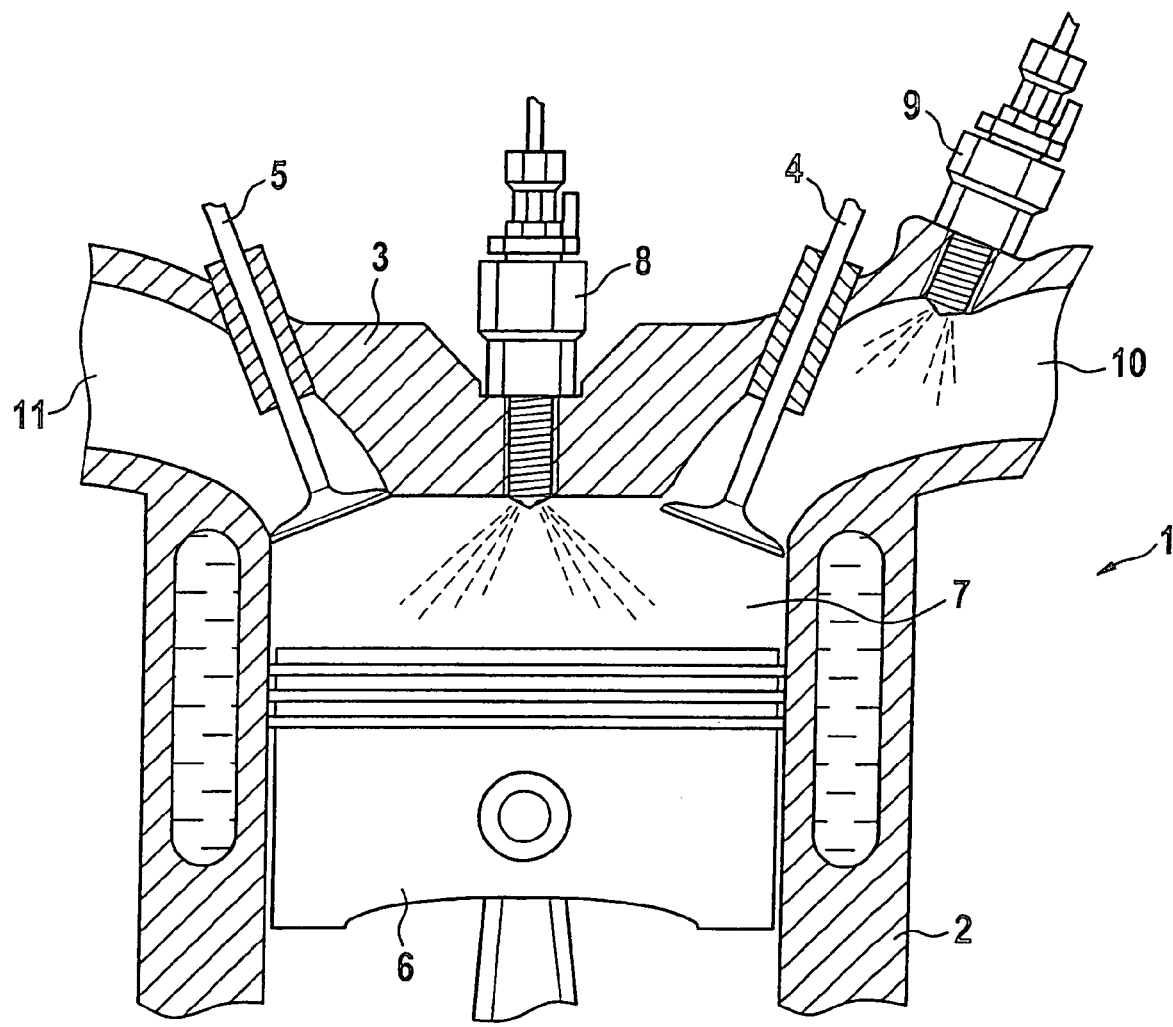
FIG. 1 shows a sectional illustration of an internal combustion engine according to the invention.

FIG. 1 illustrates a cylinder of an internal combustion engine 1 with direct and port fuel injection in which a combustion chamber 7 is formed in at least one cylinder 2 between a piston 6 which is movable longitudinally in the cylinder 2 and a cylinder head 3. The internal combustion engine 1 comprises, per combustion chamber 7, at least one inlet valve 4, at least one outlet valve 5, a first fuel injector 8, a second fuel injector 9 and an ignition source (not illustrated) which is preferably embodied as a spark plug. Furthermore, an inlet port 10 and an outlet port 11 with inlet and outlet valves are arranged in the cylinder head 3. The number of inlet and outlet valves is exemplary and can be increased as necessary.

The first fuel injector 8 is provided for direct fuel injection into the combustion chamber 7 and therefore projects into the combustion chamber 7. The second fuel injector 9 is arranged in the inlet region and is preferably configured for injecting larger fuel quantities than the first fuel injector 8.

The combustion chamber 7 of the internal combustion engine 1 is closed off at the top by the cylinder head 3, the piston 6 which is guided in the cylinder 2 bounding the combustion chamber 2 at the bottom. The internal combustion engine 1 according to the invention operates according to the four-stroke principle, it being possible to operate it as a spark ignition engine, i.e. with spark ignition, or in an auto-ignition mode depending on the load point.

Figure 2:
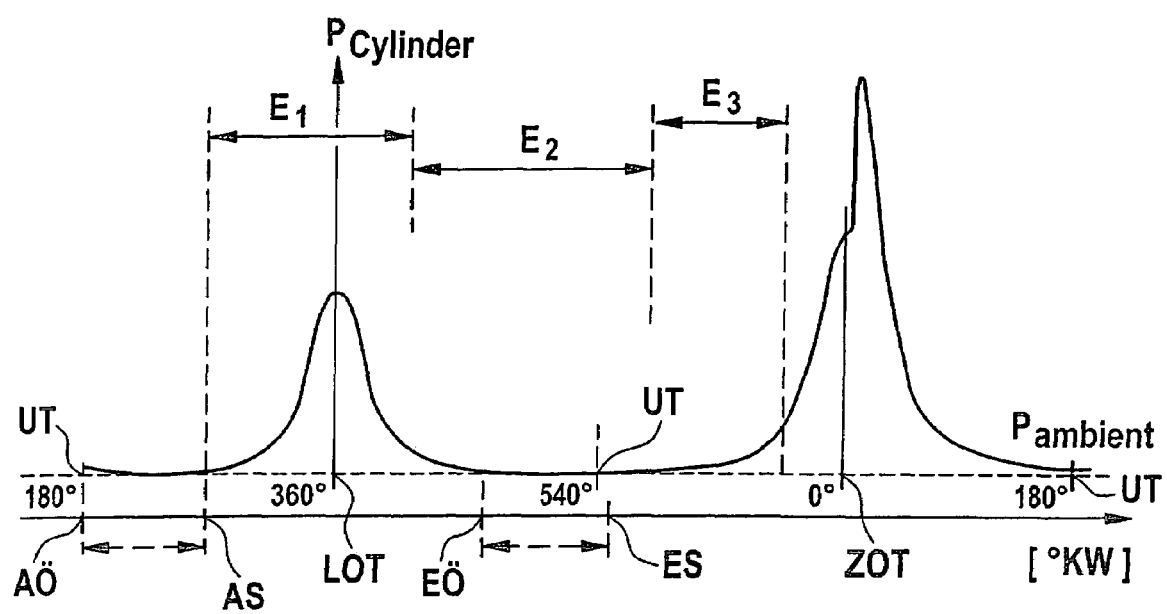
FIG. 2 shows a diagram of a cylinder pressure profile of the internal combustion engine according to FIG. 1 during a compression ignition mode plotted against the crank angle.

In a four-stroke method, one stroke corresponds to one up or down travel distance of the piston. According to FIG. 2, the profile of the combustion chamber pressure is set during one working cycle of the internal combustion engine 1 according to the invention. A working cycle of the internal combustion engine which is composed of four strokes corresponds to one combustion cycle, a combustion cycle starting with a first, that is, an intake stroke at a top dead center TDC of a charge change at which the piston 6 moves as far as a bottom dead center BDC in a downward movement.

During the intake stroke, the combustion chamber 6 is supplied with combustion air, while according to the invention a specific quantity of exhaust gas, which has been retained in the combustion chamber 6 during an expulsion stroke of a previous working cycle, is mixed with the combustion air.

The method according to the invention is aimed at setting a specific mixture reactivity of a fuel/air mixture which is formed from the first fuel quantity E1 and a subsequent, second fuel quantity E2 by means of a first injection E1 which is injected into the combustion chamber 6 in which retained exhaust gas is contained. In this way, closed-loop or open-loop control is carried out for the inception of the auto-ignition. This is advantageous in particular at operating points with a low exhaust gas temperature since reliable operation of the internal combustion engine with compression ignition is made possible even in lower rotational speed and load ranges.

The method according to the invention provides that in the compression ignition mode, the first fuel quantity E1 is injected into the retained exhaust gas by means of the first injector 8 which is arranged in the combustion chamber 7, the second fuel quantity E2 being subsequently fed to the combustion chamber 7 in the intake stroke by means of the second injector 9 arranged in the inlet region, so that a homogeneous fuel/air mixture is formed. As a result, the port injection brings about better homogenization of the fuel/air mixture. This has in particular an advantageous effect in the auto-ignition mode, for example during a cold start phase. The first injector 8 is preferably configured for injecting small fuel quantities so that the installation space which is required for the first injector 8 in the cylinder head 3 can be minimized. The position of the injector and/or the injection angle can thus be modified particularly well.

The first fuel quantity E1 makes available a relatively large amount of energy or a relatively high temperature level for a subsequent main combustion, allowing energy loss due to the relatively small fuel quantity which is converted to be compensated when low engine loads are being implemented. As a result, the current operating range with compression ignition is made larger so that further improved exhaust gas emissions can be obtained, for example in the idling mode.

The first fuel injection E1 is preferably performed between the closing of the outlet valve 5 and the opening of the inlet valve 4. Alternatively, the first fuel quantity can be injected into the exhaust gas retained in the combustion chamber 7 during the expulsion stroke of the internal combustion engine 1 between the closing of the outlet valve 5 and 270° Ca before a top dead center TDC of the ignition.

Alternatively, the first fuel quantity E1 can be injected into the combustion chamber 7 in a range between the closing of the outlet valve 5 and the top dead center TDC of a charge change. As a result, the conversion-like reactions during the first fuel injection E1 are increased. The injection of the first fuel quantity E1 leads to conversion-like reactions with which the final temperature of the mixture is influenced. As a result, the auto-ignition time is influenced. The first fuel quantity is preferably between 0% and 30% of the total fuel quantity, and the second fuel quantity can be between 30% and 80% of the total fuel quantity.

Introducing the second fuel quantity E2 into the combustion chamber 7 forms the main mixture which is compressed in the compression stroke. During the compression stroke, the piston 6 moves in an upward movement from the bottom dead center BDC as far as the top dead center TDC of the ignition. The main mixture formed is ignited in a region of the top dead center TDC of the ignition by the compression.

According to the invention, the auto-ignition timing of the fuel/air mixture which is formed from the first and second fuel quantities is established as a function of a quantity ratio E1/E2 of the first fuel quantity to the second fuel quantity. The quantity ratio E1:E2 of the first fuel quantity to the second fuel quantity is preferably between 1:100 and 2:1. A particularly advantageous preconditioning of the main mixture occurs with a quantity ratio E1:E2 between 1:5 and 1:3. The second fuel quantity E2 is preferably injected into the combustion chamber 7 in a range between 300° Ca and 120° Ca before the top dead center TDC of the ignition.

While the combustion of the main mixture is still occurring, the piston 6 moves downwardly as far as a bottom dead center BDC. The center of gravity of the combustion can be optimized according to the invention by means of an injection of a third fuel quantity E3. The third fuel quantity E3 is injected by means of the first injector 8, the injection taking place according to the invention after the injection of the second fuel quantity E2 has ended. The third fuel quantity E3 is optionally injected before or after the inception of the auto-ignition, and preferably before the top dead center TDC of the ignition so that the reactivity of the main mixture or of the total cylinder charge can be reduced or changed. The third fuel injection E3 can advantageously control the period of combustion as a function of its injection time and/or its quantity. As a result, steep rises in pressure in the combustion chamber 7 are prevented and better exhaust gas emission conditions are thus obtained. The third fuel quantity E3 is preferably 10% to 30% of the total fuel quantity.

In the following expulsion cycle, the piston moves in an upwardly as far as the top dead center TDC of the charge change and expels the exhaust gases from the combustion chamber 7. The outlet valve 5 is opened during the expulsion stroke so that the exhaust gases are expelled from the combustion chamber 7, early closing of the outlet valve 5 causing a specific quantity of exhaust gas to be retained in the combustion chamber 7.

According to the invention, the first fuel quantity E1 is converted in the region of the top dead center TDC of the charge change so that preconditioning or additional combustion causes the temperature in the combustion chamber to be increased. This leads to an increase in the pressure in the combustion chamber. The conversion of energy in the region of the top dead center TDC of the charge change also causes the temperature of the exhaust gas retained in the combustion chamber to be increased as a whole so that the large thermal losses of the exhaust gas at the walls of the combustion chamber, in particular in low rotational speed and load ranges, are compensated. A higher level of energy and a higher temperature are thus available for the subsequent main combustion compensating for an energy loss owing to the relatively small fuel quantity converted during low engine load operation. This permits reliable operation of the internal combustion engine 1 with compression ignition even in low rotational speed and load ranges. The current operating range with compression ignition is thus made larger so that further improved exhaust gas emissions can be obtained, for example in the idling mode. The main mixture can alternatively be spark-ignited by means of the ignition source as a function of the load, for example in the starting mode or in ranges with a high load, in particular at full load engine operation.

The method according to the invention permits the internal combustion engine to be operated with compression ignition essentially at all load points or in all load ranges without ignition misfiring. The first fuel injection E1 permits an HCCI internal combustion engine to operate at low loads, the optional, third fuel injection E3 avoiding steep rises in pressure at high loads. The increase in the temperature in the combustion chamber 7 at the top dead center TDC of the charge change ensures that as far as possible combustion can occur with compression ignition in every combustion cycle. It is conceivable to omit the first fuel injection E1 and to carry out the method according to the invention with the second fuel injection E2 and the third fuel injection E3.

With method according to the invention exhaust gas is retained in the combustion chamber 7 of the internal combustion engine 1 during an auto-ignition mode, said exhaust gas being compressed during a charge change and the first fuel quantity E1 being injected into the retained exhaust gas by means of a direct fuel injection. The second fuel quantity E2 is subsequently fed to the combustion chamber 7 so that a homogeneous fuel/air mixture is formed in the combustion chamber 7. In this context, an auto-ignition time of the fuel/air mixture which is formed from the first and second fuel quantities is established as a function of a quantity ratio of the first fuel quantity to the second fuel quantity.

What is claimed is:

1. A method of operating an internal combustion engine having a cylinder, a cylinder head including inlet and outlet valves, a piston movably disposed in the cylinder and defining a combustion chamber between the cylinder head and the piston to which fresh air is fed via an intake manifold, said method comprising the steps of:
    operating the internal combustion engine selectively in a compression ignition or in a spark ignition mode depending on the engine operating point, wherein, in a compression ignition mode,
    exhaust gas is retained in the combustion chamber and compressed during a charge change, and
    a first fuel quantity is injected into the retained exhaust gas by means of a first fuel injector arranged in the combustion chamber so that a homogeneous gas/air mixture is formed in the combustion chamber, and
    supplying a second fuel quantity subsequently to the combustion chamber by means of a second injector arranged in the intake manifold, so as to form a homogeneous fuel/gas/air mixture in the combustion chamber.

2. The method as claimed in claim 1, wherein an auto-ignition time of the fuel/gas/air mixture which is formed from the first and second fuel quantities is established as a function of a quantity ratio of the first fuel quantity and the second fuel quantity.

3. The method as claimed in claim 2, wherein the quantity ratio of the first fuel quantity and the second fuel quantity is selected to be between 1:100 and 2:1.

4. The method as claimed in claim 3, wherein the quantity ratio is between 1:5 and 1:3.

5. The method as claimed in claim 2, wherein a center area of combustion is established by injecting a third fuel quantity, the third fuel quantity being injected after the injection of the end of second fuel quantity injection and before the piston has reached its top dead center position.

6. The method as claimed in claim 5, wherein a combustion duration is established as a function of the third fuel quantity and the injection timing for the third fuel quantity.

7. The method as claimed in claim 1, wherein the first fuel quantity is between 0% and 30% of the total fuel quantity and the second fuel quantity is between 30% and 100% of the total fuel quantity.

8. The method as claimed in claim 5, wherein the third fuel quantity is between 10% and 30% of the total fuel quantity.

* * * * *